(12) United States Patent
Uchiyama et al.

(10) Patent No.: US 9,200,105 B2
(45) Date of Patent: Dec. 1, 2015

(54) NAPHTHALENE FORMALDEHYDE RESIN, DEACETALIZED NAPHTHALENE FORMALDEHYDE RESIN, AND MODIFIED NAPHTHALENE FORMALDEHYDE RESIN

(71) Applicant: MITSUBISHI GAS CHEMICAL COMPANY, INC., Tokyo (JP)

(72) Inventors: Naoya Uchiyama, Kanagawa (JP); Go Higashihara, Kanagawa (JP); Masatoshi Echigo, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/375,660

(22) PCT Filed: Jan. 31, 2013

(86) PCT No.: PCT/JP2013/052129
§ 371 (c)(1),
(2) Date: Jul. 30, 2014

(87) PCT Pub. No.: WO2013/115290
PCT Pub. Date: Aug. 8, 2013

(65) Prior Publication Data
US 2015/0018499 A1 Jan. 15, 2015

(30) Foreign Application Priority Data
Jan. 31, 2012 (JP) ................................. 2012-018080

(51) Int. Cl.
*C08G 10/04* (2006.01)
*C08G 10/02* (2006.01)
*C08L 61/18* (2006.01)

(52) U.S. Cl.
CPC ................ *C08G 10/04* (2013.01); *C08G 10/02* (2013.01); *C08L 61/18* (2013.01)

(58) Field of Classification Search
None
See application file for complete search history.

(56) References Cited

U.S. PATENT DOCUMENTS

| 3,940,448 | A | * | 2/1976 | Hoy | ................................. 568/49 |
| 4,350,623 | A | * | 9/1982 | Robinson et al. | ............. 524/391 |
| 4,689,392 | A | * | 8/1987 | Miyamoto et al. | ............ 528/247 |
| 2004/0266976 | A1 | | 12/2004 | Senzaki et al. | |
| 2007/0238850 | A1 | | 10/2007 | Ogiwara et al. | |
| 2010/0324255 | A1 | | 12/2010 | Kita et al. | |

FOREIGN PATENT DOCUMENTS

| CN | 1608088 | 4/2005 |
| CN | 101861344 | 10/2010 |
| EP | 0036705 | 9/1981 |
| GB | 633923 | 12/1949 |
| GB | 666873 | 2/1952 |
| GB | 720034 | 12/1954 |
| GB | 942057 | 11/1963 |
| GB | 1356262 | 12/1970 |
| JP | 54-86593 | 7/1979 |
| JP | 61-228013 | 10/1986 |
| JP | 63-97615 | 4/1988 |
| JP | 4-224825 | 8/1992 |
| JP | 11-092543 | 4/1999 |
| JP | 2000-143937 | 5/2000 |
| JP | 2003-192755 | 7/2003 |
| JP | 2004-91550 | 3/2004 |
| JP | 2005-179448 | 7/2005 |
| JP | 2007-297610 | 11/2007 |
| JP | 2009-155638 | 7/2009 |
| JP | 2011-046837 | 3/2011 |
| WO | 03/055927 | 7/2003 |

OTHER PUBLICATIONS

Search report from International Bureau of WIPO, mail date is May 14, 2013.
International Preliminary Report on Patentability issued Aug. 5, 2014 in English in PCT/JP2013/052129.
David F Gould: "Phenolic Resins", Jan. 1, 1959, Phenolic Resins, pp. I-II, 34, XP002710765.

* cited by examiner

*Primary Examiner* — Marc Zimmer
(74) *Attorney, Agent, or Firm* — Greenblum & Bernstein, P.L.C.

(57) ABSTRACT

Provided are a naphthalene formaldehyde resin obtained by reacting a compound (A) represented by formula (1) and formaldehyde (B) in a molar ratio, (A):(B), of 1:1 to 1:20 in the presence of an acidic catalyst, and a deacetalized naphthalene formaldehyde resin and a modified naphthalene formaldehyde resin derived therefrom.

2 Claims, No Drawings

NAPHTHALENE FORMALDEHYDE RESIN, DEACETALIZED NAPHTHALENE FORMALDEHYDE RESIN, AND MODIFIED NAPHTHALENE FORMALDEHYDE RESIN

TECHNICAL FIELD

The present invention relates to a naphthalene formaldehyde resin, a deacetalized naphthalene formaldehyde resin, and a modified naphthalene formaldehyde resin.

BACKGROUND ART

An aromatic hydrocarbon resin, which is obtained by reacting a polycyclic aromatic hydrocarbon including, as a main component, an alkylnaphthalene such as methylnaphthalene and/or a dialkylnaphthalene such as dimethylnaphthalene, and paraformaldehyde in the presence of an aromatic monosulfonic acid, has been conventionally known as a resin excellent in compatibility with an epoxy resin and the like and solubility in an organic solvent such as xylene (see Patent Literature 1). A phenol resin, which is obtained by reacting a methoxymethylene naphthalene compound and a compound having a phenolic hydroxyl group, such as phenol, cresol or naphthol, in the presence of diethyl sulfate, and has a structure in which naphthalene and the compound having a phenolic hydroxyl group bind to each other via a methylene group, has also been known as a resin for an epoxy resin-curing agent, having a good moldability and the like (see Patent Literature 2).

A method for providing a modified dimethylnaphthalene formaldehyde resin having high heat resistant by modifying a dimethylnaphthalene formaldehyde resin with naphthols or phenols has also been known (see Patent Literatures 3 and 4).

As other polycyclic aromatic hydrocarbon, for example, an acenaphthene resin having a unit structure represented by the following formula has been known (see Patent Literature 5).

[Formula 1]

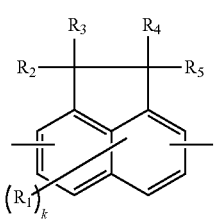

wherein $R_1$ represents a monovalent atom or group and k represents an integer of 0 to 4, provided that when k represents 2 to 4, a plurality of $R_1$ may be the same or different; and $R_2$ to $R_5$ independently represent a hydroxy group, or a monovalent atom or group.

Furthermore, a method for producing a polycyclic aromatic condensate, including condensing a polycyclic aromatic hydrocarbon and formaldehyde in the presence of an acid catalyst, and then condensing the resultant by an aromatic hydrocarbon having a hydroxyl group or the like (see Patent Literature 6), and a naphthalene-based oligomer having a high refractive index, obtained by condensing naphthalenes and formaldehydes in the presence of an acid catalyst (see Patent Literature 7) have also been known.

In addition, a method for treating an aromatic hydrocarbon formaldehyde resin, including heating an aromatic hydrocarbon formaldehyde resin in the presence of an acid catalyst, and blowing steam thereto to reduce the number of acetal groups in the aromatic hydrocarbon formaldehyde resin (see Patent Literature 8), and a method for producing an aromatic hydrocarbon phenol resin, including reacting phenols and an aromatic hydrocarbon aldehyde resin using phosphoric acids for a catalyst (see Patent Literature 9) have also been known.

CITATION LIST

Patent Literatures

Patent Literature 1: Japanese Patent Laid-Open No. 554-86593
Patent Literature 2: Japanese Patent Laid-Open No. 2004-91550
Patent Literature 3: Japanese Patent Laid-Open No. 2009-155638
Patent Literature 4: Japanese Patent Laid-Open No. 2011-46837
Patent Literature 5: Japanese Patent Laid-Open No. 2000-143937
Patent Literature 6: Japanese Patent Laid-Open No. 563-97615
Patent Literature 7: Japanese Patent Laid-Open No. 2003-192755
Patent Literature 8: Japanese Patent Laid-Open No. H4-224825
Patent Literature 9: Japanese Patent Laid-Open No. 2005-179448

SUMMARY OF INVENTION

Technical Problem

However, the resins obtained by Patent Literatures 1 to 4 have a room for further improvement particularly in thermal decomposition resistance, and the resin obtained by Patent Literature 5 has a room for further improvement particularly in solubility in a solvent.

In addition, Patent Literature 6 specifically discloses, in Examples, a primary condensate obtained by a condensation reaction of phenanthrene and formalin in a molar ratio of 1:0.85, and a secondary condensate obtained by adding p-xylylene glycol as a crosslinking agent to the primary condensate, but the present inventors have made studies and have thus found that the primary condensate and the secondary condensate obtained by the method are not sufficient in terms of solvent solubility. In addition, Patent Literature 6 describes the improvements in heat resistance and moldability, but does not describe solvent solubility.

Patent Literature 7 discloses, in Examples, an oligomer obtained by reacting naphthalene and formalin in a molar ratio of 1:0.8, but the reaction rate of naphthalene is not sufficient. In addition, Patent Literature 7 discloses only that the oligomer is excellent in transparency and has a high refractive index, and neither discloses nor suggests solubility and thermal decomposition resistance.

Furthermore, in Examples in Patent Literature 8 and Patent Literature 9, since an aromatic hydrocarbon formaldehyde resin whose raw material is an aromatic hydrocarbon having 7 to 9 carbon atoms is used, the methods are not sufficient in terms of thermal decomposition resistance.

An object of the present invention is to provide a resin excellent in thermal decomposition resistance and also solubility in a solvent, and usable as a resin for electronic materials.

Solution to Problem

The present inventors have made intensive studies, and as a result, have found that a resin obtained by reacting a compound represented by formula (1) and formaldehyde in the presence of an acidic catalyst, and a resin obtained by reacting a compound represented by formula (2) in the presence of an acidic catalyst can solve the above problems, thereby leading to the present invention.

That is, the present invention is as follows.

[1]

A naphthalene formaldehyde resin obtained by reacting a compound (A) represented by formula (1) and formaldehyde (B) in a molar ratio, (A):(B), of 1:1 to 1:20 in the presence of an acidic catalyst.

[Formula 2]

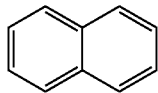
(1)

[2]

The naphthalene formaldehyde resin according to [1], wherein at least a part of naphthalene rings is crosslinked by a bond comprising a bond represented by formula (i) and/or a bond represented by formula (ii):

—(CH$_2$)$_p$— (i)

—CH$_2$-A- (ii)

wherein p in the formula (i) represents an integer of 1 to 10, A in the formula (ii) represents (OCH$_2$)$_m$, and m represents an integer of 1 to 10.

[3]

The naphthalene formaldehyde resin according to [1] or [2], having a weight average molecular weight of 300 to 2000.

[4]

The naphthalene formaldehyde resin according to any one of [1] to [3], having a carbon content of 75 to 90% by mass.

[5]

The naphthalene formaldehyde resin according to any one of [1] to [4], wherein the reaction of the compound (A) and formaldehyde (B) is performed under the coexistence with an alcohol.

[6]

A method for producing a naphthalene formaldehyde resin, comprising reacting a compound (A) represented by formula (1) and formaldehyde (B) in a molar ratio, (A):(B), of 1:1 to 1:20 in the presence of an acidic catalyst.

[Formula 3]

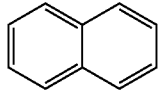
(1)

[7]

The method for producing the naphthalene formaldehyde resin according to [6], wherein the reaction of the compound (A) and formaldehyde (B) is performed under the coexistence with an alcohol.

[8]

A deacetalized naphthalene formaldehyde resin obtained by subjecting the naphthalene formaldehyde resin according to [1] to a deacetal treatment in the presence of an acidic catalyst.

[9]

A method for producing a deacetalized naphthalene formaldehyde resin, comprising a step of subjecting the naphthalene formaldehyde resin according to [1] to a deacetal treatment in the presence of an acidic catalyst, wherein an amount of the acidic catalyst used is 0.0001 to 100 parts by mass based on 100 parts by mass of the naphthalene formaldehyde resin.

[10]

The method for producing the deacetalized naphthalene formaldehyde resin according to [9], wherein the deacetal treatment is performed at a reaction temperature of 80 to 300° C. for a reaction time of 0.5 to 20 hours.

[11]

A modified naphthalene formaldehyde resin obtained by reacting the naphthalene formaldehyde resin according to [1] or the deacetalized naphthalene formaldehyde resin according to [8] and a compound represented by formula (2) in the presence of an acidic catalyst:

[Formula 4]

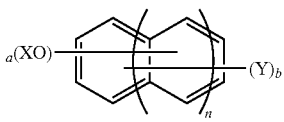
(2)

wherein X and Y each independently represent a hydrogen atom, an alkyl group having 1 to 10 carbon atoms, an aryl group having 6 to 10 carbon atoms or a cyclohexyl group, a and b each represent an integer of 1 to 3, and n represents an integer of 0 to 2.

[12]

The modified naphthalene formaldehyde resin according to [11], wherein the compound represented by the formula (2) is at least one selected from the group consisting of phenol, phenylphenol, naphthol, dihydroxynaphthalene, hydroxyanthracene and dihydroxyanthracene.

Advantageous Effects of Invention

The naphthalene formaldehyde resin, the deacetalized naphthalene formaldehyde resin and the modified naphthalene formaldehyde resin of the present invention are excellent in thermal decomposition resistance and solubility in a solvent.

DESCRIPTION OF EMBODIMENTS

Hereinafter, an embodiment of the present invention (hereinafter, referred to as "the present embodiment") will be described. It is to be noted that the present embodiment is illustrative for describing the present invention and the present invention is not limited to the present embodiment.

<Naphthalene Formaldehyde Resin>

A naphthalene formaldehyde resin is obtained by a condensation reaction of a compound represented by formula (1) and formaldehyde in the presence of an acidic catalyst.

From the viewpoint of a balance between oxygen content and heat resistance, the naphthalene formaldehyde resin obtained by the reaction preferably has a structure in which at least a part of naphthalene rings is crosslinked by a bond represented by formula (i) and/or a bond represented by formula (ii):

—(CH$_2$)$_p$— (i)

—CH$_2$-A- (ii)

wherein p in the formula (i) represents an integer of 1 to 10, A in the formula (ii) represents $(OCH_2)_m$, and m represents an integer of 1 to 10.

In the preferable aspect, the at least a part of naphthalene rings may be crosslinked by a bond in which the bond represented by $-(CH_2)_p-$ and the bond represented by $-(OCH_2)_m-$ are randomly arranged, for example, by $-CH_2-OCH_2-CH_2-$, $-(CH_2)_2-OCH_2-$ or $-CH_2-OCH_2-OCH_2-CH_2-$.

The compound represented by the formula (1) in the present embodiment is naphthalene. Such naphthalene is not particularly limited, and industrially available naphthalene can be utilized therefor.

Since the naphthalene formaldehyde resin of the present embodiment has naphthalene rings, it is more excellent in thermal decomposition resistance than an aromatic hydrocarbon formaldehyde resin whose aromatic hydrocarbon has 7 to 9 carbon atoms. In addition, since the naphthalene formaldehyde resin is not substituted, it is more excellent in thermal decomposition resistance than an aromatic hydrocarbon formaldehyde resin having a substituted naphthalene ring. Furthermore, the naphthalene formaldehyde resin is more excellent in solubility in a solvent than a tricyclic aromatic hydrocarbon formaldehyde resin such as phenanthrene formaldehyde resin.

Formaldehyde in the present embodiment is not particularly limited, and includes an aqueous formaldehyde solution that is usually industrially available.

Formaldehyde in the present embodiment encompasses formaldehyde generated by using a compound which generates formaldehyde, such as paraformaldehyde and trioxane. From the viewpoint of suppressing gelation, formaldehyde in the present embodiment is preferably an aqueous formaldehyde solution.

In the condensation reaction in the present embodiment, the molar ratio of the compound represented by the formula (1) to formaldehyde is 1:1 to 1:20. Since the naphthalene formaldehyde resin of the present embodiment is obtained by the condensation reaction of the compound represented by the formula (1) and formaldehyde in such a ratio, it has many crosslinking structures. In addition, when the ratio falls within the above range, the amount of the remaining unreacted naphthalene can be reduced to keep the yield of the naphthalene formaldehyde resin relatively high.

It has been conventionally known that when the amount of formaldehyde is large, there causes the problem of gelation or the like (Japanese Patent Laid-Open No. 2003-192755). However, the present inventors have made studies, and as a result, have found that the amount of formaldehyde can be increased while a measure for suppressing gelation is adopted in which an aqueous formaldehyde solution, instead of paraformaldehyde, is used as a formaldehyde raw material, thereby surprisingly improving thermal decomposition resistance and solubility without causing gelation.

The molar ratio of the compound represented by the formula (1) to formaldehyde is preferably 1:1.5 to 1:17.5, more preferably 1:2 to 1:15, further preferably 1:2 to 1:12.5, still more preferably 1:2.5 to 1:10, particularly preferably 1:3 to 1:10, and most preferably 1:3 to 1:5.

The acidic catalyst in the present embodiment is not particularly limited, and a known inorganic acid or organic acid can be used therefor. The acidic catalyst includes an inorganic acid such as hydrochloric acid, sulfuric acid, phosphoric acid, hydrobromic acid or hydrofluoric acid; an organic acid such as oxalic acid, malonic acid, succinic acid, adipic acid, sebacic acid, citric acid, fumaric acid, maleic acid, formic acid, p-toluenesulfonic acid, methanesulfonic acid, trifluoroacetic acid, dichloroacetic acid, trichloroacetic acid, trifluoromethanesulfonic acid, benzenesulfonic acid, naphthalenesulfonic acid or naphthalenedisulfonic acid; a Lewis acid such as zinc chloride, aluminum chloride, iron chloride or boron trifluoride; or a solid acid such as tungstosilicic acid, phosphotungstic acid, silicomolybdic acid or phosphomolybdic acid.

Among them, sulfuric acid, oxalic acid, citric acid, p-toluenesulfonic acid, methanesulfonic acid, trifluoromethanesulfonic acid, benzenesulfonic acid, naphthalenesulfonic acid, naphthalenedisulfonic acid, and phosphotungstic acid are preferable in terms of production.

The amount of the acidic catalyst used is adjusted, but not particularly limited, so as to be preferably 0.0001 to 100 parts by mass, more preferably 0.001 to 85 parts by mass, and further preferably 0.001 to 70 parts by mass, based on 100 parts by mass of the total amount of the compound represented by formula (1) and formaldehyde. When the amount falls within such a range, a proper reaction rate can be achieved, and the increase in resin viscosity due to on a high reaction rate can be prevented.

The manner of adding acidic catalyst is not particularly limited, and acidic catalyst may be collectively added or may be added in portions.

The pressure of the condensation reaction in the present embodiment is not particularly limited, and may be ordinary pressure or increased pressure.

The condensation reaction in the present embodiment is not particularly limited, and, for example, there is a method for performing the condensation reaction at ordinary pressure while heating under reflux at a temperature, where raw materials used are compatible, or higher (usually 80 to 300° C.), or while water generated being distilling off.

In the condensation reaction in the present embodiment, if necessary, an inert gas such as nitrogen, helium or argon may also be allowed to pass through the system.

In the condensation reaction in the present embodiment, if necessary, an inert solvent can also be used in the condensation reaction. Examples of the solvent include aromatic hydrocarbons such as toluene, ethylbenzene and xylene; saturated aliphatic hydrocarbons such as heptane and hexane; alicyclic hydrocarbons such as cyclohexane; ethers such as dioxane and dibutyl ether; alcohols such as 2-propanol; ketones such as methyl isobutyl ketone; carboxylic acid esters such as ethyl propionate; and carboxylic acids such as acetic acid.

The condensation reaction in the present embodiment is not particularly limited, but is preferably performed under the coexistence with an alcohol, because in the case of the coexistence with an alcohol, the terminal of the resin is terminated by the alcohol to provide a naphthalene formaldehyde resin having a low molecular weight and a low distribution (narrow molecular distribution) and such a resin can also provide a modified resin good in solvent solubility and low in melt viscosity. The alcohol is not particularly limited, and examples thereof include a monool having 1 to 12 carbon atoms and a diol having 1 to 12 carbon atoms. These alcohols can be used singly or in combination of two or more. Among them, propanol, butanol, octanol, and 2-ethylhexanol are preferable from the viewpoint of productivity of the naphthalene formaldehyde resin.

In the case of the coexistence with the alcohol, the amount of the alcohol is not particularly limited, but is preferably such an amount that a hydroxyl group is 1 to 10 equivalents based on 1 mol of the compound represented by formula (1), for example.

In the condensation reaction in the present embodiment, naphthalene, formaldehyde, and the acidic catalyst may be simultaneously added to the reaction system, or naphthalene may be sequentially added to the system in which formaldehyde and the acidic catalyst are present. The sequentially adding method is preferable from the viewpoint of allowing the resulting resin to have an increased oxygen content and to react with a larger amount of a compound represented by formula (2) in a subsequent modification step.

The reaction time is not particularly limited, but is preferably 0.5 to 30 hours, more preferably 0.5 to 20 hours, and further preferably 0.5 to 10 hours. When the reaction time falls within such a range, a resin excellent in thermal decomposition resistance and solubility in a solvent is obtained economically and industrially advantageously.

The reaction temperature is not particularly limited, but is preferably 80 to 300° C., more preferably 85 to 270° C., and further preferably 90 to 240° C. When the reaction temperature falls within such a range, a resin excellent in thermal decomposition resistance and solubility in a solvent is obtained economically and industrially advantageously.

After the completion of the reaction; the solvent is, if necessary, further added for dilution and then left to still stand to thereby separate two phases; a resin phase as an oil phase and an aqueous phase are separated from each other; thereafter washing with water is performed to thereby completely remove the acidic catalyst; and the solvent added and the unreacted raw materials are removed by a common method such as distillation, thereby providing the naphthalene formaldehyde resin.

The naphthalene formaldehyde resin of the present embodiment preferably, but not particularly limited, has a number average molecular weight (Mn) in terms of polystyrene determined by gel permeation chromatography (GPC) analysis, of 275 to 1000, more preferably 300 to 900, further preferably 325 to 800, from the viewpoints of thermal decomposition resistance and solubility in a solvent.

The naphthalene formaldehyde resin of the present embodiment preferably, but not particularly limited, has a weight average molecular weight (Mw) in terms of polystyrene determined by GPC analysis, of 300 to 2000, more preferably 350 to 1750, further preferably 400 to 1500, from the viewpoints of thermal decomposition resistance and solubility in a solvent.

The naphthalene formaldehyde resin of the present embodiment preferably, but not particularly limited, has a distribution (Mw/Mn) of 1.2 to 2.5, more preferably 1.25 to 2.25, further preferably 1.3 to 2.0, from the viewpoints of thermal decomposition resistance and solubility in a solvent.

The naphthalene formaldehyde resin of the present embodiment preferably, but not particularly limited, has a carbon content in the resin by organic elemental analysis, of 75 to 90% by mass, more preferably 76.5 to 87.5% by mass, further preferably 78 to 85% by mass, from the viewpoints of thermal decomposition resistance and solubility in a solvent.

The naphthalene formaldehyde resin of the present embodiment preferably, but not particularly limited, has an oxygen content in the resin by organic elemental analysis, of 4 to 17% by mass, more preferably 5 to 16% by mass, further preferably 6 to 15% by mass, from the viewpoints of thermal decomposition resistance, solubility in a solvent, the load in a deacetal treatment step described later, and the reactivity with a compound represented by formula (2) in a modification step described later.

The naphthalene formaldehyde resin of the present embodiment is preferably, but not particularly limited to, one that is liquid at room temperature (25° C.), and preferably has a softening point of 120° C. or lower, more preferably 110° C., further preferably 100° C. or lower, from the viewpoints of thermal decomposition resistance and handling.

The naphthalene formaldehyde resin of the present embodiment preferably, but not particularly limited, has a hydroxyl value of 10 to 50, more preferably 12.5 to 45, further preferably 15 to 40, from the viewpoints of thermal decomposition resistance and solubility in a solvent.

<Deacetalized Naphthalene Formaldehyde Resin>

A deacetalized naphthalene formaldehyde resin of the present embodiment is obtained by subjecting the above-described naphthalene formaldehyde resin to a deacetal treatment in the presence of water and an acidic catalyst.

The naphthalene formaldehyde resin generally has a naphthalene ring crosslinked by $-(CH_2)_p-$ and/or $-CH_2-A-$. A represents $(OCH_2)_m$, p represents an integer of 1 to 10, and m represents an integer of 1 to 10.

The deacetalized naphthalene formaldehyde resin of the present embodiment refers to one that is obtained by subjecting the naphthalene formaldehyde resin to a deacetal treatment to thereby reduce the number of bonds between oxymethylenes via no naphthalene ring, resulting in the reduction in number of p and/or m.

The deacetalized naphthalene formaldehyde resin of the present embodiment exerts the effect of being excellent in storage stability and also thermal decomposition resistance because the naphthalene formaldehyde resin to be subjected to a deacetal treatment is a naphthalene formaldehyde resin obtained by condensing naphthalene and formaldehyde in a molar ratio of 1:1 to 1:20.

The deacetalized naphthalene formaldehyde resin of the present embodiment has a naphthalene backbone, and therefore exerts the effect of being more excellent in storage stability than a resin including, as a backbone, an aromatic hydrocarbon having 7 to 9 carbon atoms.

As compared with the naphthalene formaldehyde resin, the deacetalized naphthalene formaldehyde resin thus obtained can provide a modified resin having improved thermal decomposition resistance and storage stability.

The acidic catalyst can be appropriately selected from known inorganic acids and organic acids, and examples thereof include an inorganic acid such as hydrochloric acid, sulfuric acid, phosphoric acid, hydrobromic acid or hydrofluoric acid, an organic acid such as oxalic acid, malonic acid, succinic acid, adipic acid, sebacic acid, citric acid, fumaric acid, maleic acid, formic acid, p-toluenesulfonic acid, methanesulfonic acid, trifluoroacetic acid, dichloroacetic acid, trichloroacetic acid, trifluoromethanesulfonic acid, benzenesulfonic acid, naphthalenesulfonic acid or naphthalenedisulfonic acid, a Lewis acid such as zinc chloride, aluminum chloride, iron chloride or boron trifluoride, or a solid acid such as tungstosilicic acid, phosphotungstic acid, silicomolybdic acid or phosphomolybdic acid. Among them, sulfuric acid, oxalic acid, citric acid, p-toluenesulfonic acid, methanesulfonic acid, trifluoromethanesulfonic acid, benzenesulfonic acid, naphthalenesulfonic acid, naphthalenedisulfonic acid, and phosphotungstic acid are preferable in terms of production.

The treatment in the presence of water and the acidic catalyst is usually performed in the presence of the acidic catalyst at ordinary pressure while water to be used being dropped or sprayed as steam to the system at a temperature where raw materials used are compatible, or higher (usually 80 to 300° C.). Water in the system may be distilled off or refluxed, but is preferably distilled off together with a low boiling point component generated in the reaction, such as formaldehyde, because an acetal bond can be effectively removed. The pressure may be ordinary pressure or increased pressure. If necessary, an inert gas such as nitrogen, helium or argon may also be allowed to pass through the system.

If necessary, an inert solvent can also be used in the reaction. Examples of the solvent include aromatic hydrocarbons such as toluene, ethylbenzene and xylene; saturated aliphatic hydrocarbons such as heptane and hexane; alicyclic hydrocarbons such as cyclohexane; ethers such as dioxane and dibutyl ether; alcohols such as 2-propanol; ketones such as methyl isobutyl ketone; carboxylic acid esters such as ethyl propionate; and carboxylic acids such as acetic acid.

The amount of the acidic catalyst used is not particularly limited, but is adjusted so as to be 0.0001 to 100 parts by mass, preferably 0.001 to 85 parts by mass, and further preferably 0.001 to 70 parts by mass, based on 100 parts by mass of the naphthalene formaldehyde resin. When the amount falls within such a range, a proper reaction rate can be achieved, and the increase in resin viscosity based on a high reaction rate can be prevented. The acidic catalyst may be collectively charged or may be charged in portions.

Water that can be used in the treatment is not particularly limited, and includes one that is acceptable to industrial use, for example, tap water, distilled water, ion-exchange water, pure water or ultrapure water.

The amount of water used is not particularly limited, but is preferably 0.1 to 10000 parts by mass, more preferably 1 to 5000 parts by mass, and further preferably 10 to 3000 parts by mass, based on 100 parts by mass of the naphthalene formaldehyde resin.

The treatment time is not particularly limited, but is preferably 0.5 to 20 hours, more preferably 1 to 15 hours, and further preferably 2 to 10 hours. When the treatment time falls within such a range, a resin excellent in thermal decomposition resistance and solvent solubility is obtained economically and industrially.

In the present embodiment, the treatment temperature is not particularly limited, but is preferably 80 to 300° C., more preferably 85 to 270° C., and further preferably 90 to 240° C. When the treatment temperature falls within such a range, a resin excellent in thermal decomposition resistance and solvent solubility is obtained economically and industrially.

The deacetalized naphthalene formaldehyde resin has a reduced oxygen content and an increased softening point as compared with the naphthalene formaldehyde resin. When the treatment is performed under conditions, for example, of an amount of the acidic catalyst used of 0.05 parts by mass, an amount of water used of 2000 parts by mass, a treatment time of 5 hours, and a treatment temperature of 150° C., the resulting resin has a reduced oxygen content by about 0.1 to 8.0% by mass and an increased softening point by about 3 to 100° C.

The deacetalized naphthalene formaldehyde resin of the present embodiment preferably, but not particularly limited, has a number average molecular weight (Mn) in terms of polystyrene determined by gel permeation chromatography (GPC) analysis, of 250 to 1500, more preferably 275 to 1400, further preferably 300 to 1300, from the viewpoints of thermal decomposition resistance and solubility in a solvent.

The deacetalized naphthalene formaldehyde resin of the present embodiment preferably, but not particularly limited, has a weight average molecular weight (Mw) in terms of polystyrene determined by GPC analysis, of 300 to 5000, more preferably 400 to 4000, further preferably 500 to 3000, from the viewpoints of thermal decomposition resistance and solubility in a solvent.

The deacetalized naphthalene formaldehyde resin of the present embodiment preferably, but not particularly limited, has a distribution (Mw/Mn) of 1.2 to 7.0, more preferably 1.25 to 6.75, further preferably 1.3 to 6.5, from the viewpoints of thermal decomposition resistance and solubility in a solvent.

The deacetalized naphthalene formaldehyde resin of the present embodiment preferably, but not particularly limited, has a carbon content in the resin by organic elemental analysis, of 75 to 92% by mass, more preferably 77.5 to 91% by mass, further preferably 80 to 90% by mass, from the viewpoints of thermal decomposition resistance and solubility in a solvent.

The deacetalized naphthalene formaldehyde resin of the present embodiment preferably, but not particularly limited, has an oxygen content in the resin by organic elemental analysis, of 2.5 to 15% by mass, more preferably 3 to 13% by mass, further preferably 3.5 to 11% by mass, from the viewpoints of thermal decomposition resistance, solubility in a solvent, and the reactivity with a compound represented by formula (2) in a modification step described later.

The deacetalized naphthalene formaldehyde resin of the present embodiment preferably, but not particularly limited, has a softening point of 50 to 120° C., more preferably 60 to 110° C., further preferably 70 to 100° C., from the viewpoints of thermal decomposition resistance and handling.

The deacetalized naphthalene formaldehyde resin of the present embodiment preferably, but not particularly limited, has a hydroxyl value of 5 to 50, more preferably 7.5 to 45, further preferably 10 to 40, from the viewpoints of thermal decomposition resistance and solubility in a solvent.

<Modified Naphthalene Formaldehyde Resin>

A modified naphthalene formaldehyde resin of the present embodiment is obtained by heating the above-described naphthalene formaldehyde resin or the above-described deacetalized naphthalene formaldehyde resin and a compound represented by formula (2) in the presence of an acidic catalyst to react them.

In the present embodiment, the reaction is referred to as a modification reaction.

[Formula 5]

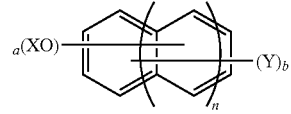

(2)

wherein X and Y each independently represent a hydrogen atom, an alkyl group having 1 to 10 carbon atoms, an aryl group having 6 to 10 carbon atoms or a cyclohexyl group, a and b each represent an integer of 1 to 3, and n represents an integer of 0 to 2.

In the formula (2), X and Y preferably represent an alkyl group having 1 to 4 carbon atoms, an aryl group having 6 to 10 carbon atoms or a cyclohexyl group, a and b preferably represent 1 to 2, and n preferably represents 1 to 2, in terms of production.

Specific examples of the compound represented by the formula (2) include phenol, methoxyphenol, benzoxyphenol, catechol, resorcinol, hydroquinone, cresol, phenylphenol, naphthol, methoxynaphthol, benzoxynaphthol, dihydroxynaphthalene, hydroxyanthracene, methoxyanthracene, benzoxyanthracene, and dihydroxyanthracene.

Among them, a phenol derivative including a conjugate structure that involves unshared electron pairs from at least two benzene rings is preferable because of being excellent in thermal decomposition resistance, and phenol, phenylphenol, naphthol, methoxynaphthol, benzoxynaphthol, dihydroxynaphthalene, hydroxyanthracene, methoxyanthracene, benzoxyanthracene, and dihydroxyanthracene are more preferable.

In addition, among them, one having a hydroxy group is further preferable because of being excellent in crosslinkability with an acid crosslinking agent, and phenol, phenylphenol, naphthol, dihydroxynaphthalene, hydroxyanthracene, and dihydroxyanthracene are particularly preferable.

The amount of the compound represented by the formula (2) used is preferably 0.1 to 5 mol, more preferably 0.2 to 4 mol, and further preferably 0.3 to 3 mol, based on 1 mol of oxygen contained in the naphthalene formaldehyde resin. When the amount falls within such a range, the yield of the resulting modified naphthalene resin can be kept relatively high, and also the amount of the remaining unreacted compound represented by (2) can be reduced.

Herein, the molar number of oxygen contained can be calculated according to the following expression, wherein the oxygen content (% by mass) in the naphthalene formaldehyde resin is measured by organic elemental analysis.

Molar number of oxygen contained (mol)=amount of resin used (g)×oxygen content (% by mass)/16

The acidic catalyst that can be used in the modification reaction in the present embodiment is not particularly limited, and can be appropriately selected from known inorganic acids and organic acids, and examples thereof include an inorganic acid such as hydrochloric acid, sulfuric acid, phosphoric acid, hydrobromic acid or hydrofluoric acid; an organic acid such as oxalic acid, malonic acid, succinic acid, adipic acid, sebacic acid, citric acid, fumaric acid, maleic acid, formic acid, p-toluenesulfonic acid, methanesulfonic acid, trifluoroacetic acid, dichloroacetic acid, trichloroacetic acid, trifluoromethanesulfonic acid, benzenesulfonic acid, naphthalenesulfonic acid or naphthalenedisulfonic acid; a Lewis acid such as zinc chloride, aluminum chloride, iron chloride or boron trifluoride; or a solid acid such as tungstosilicic acid, phosphotungstic acid, silicomolybdic acid or phosphomolybdic acid. Among them, sulfuric acid, oxalic acid, citric acid, p-toluenesulfonic acid, methanesulfonic acid, trifluoromethanesulfonic acid, benzenesulfonic acid, naphthalenesulfonic acid, naphthalenedisulfonic acid, and phosphotungstic acid are preferable from the viewpoints of environmental problems and production.

The amount of the acidic catalyst used is adjusted, but not particularly limited, so as to be preferably 0.0001 to 100 parts by mass, more preferably 0.001 to 85 parts by mass, and further preferably 0.001 to 70 parts by mass, based on 100 parts by mass of the naphthalene formaldehyde resin. When the amount falls within such a range, a proper reaction rate can be achieved, and the increase in resin viscosity based on a high reaction rate can be prevented. In addition, the acidic catalyst may be collectively charged or may be charged in portions.

The modification reaction in the present embodiment is not particularly limited, and, for example, is usually performed in the presence of the acidic catalyst at ordinary pressure, while heating under reflux at a temperature where raw materials used are compatible, or higher (usually 80 to 300° C.), or while water generated being distilled off. The pressure may be ordinary pressure or increased pressure. If necessary, an inert gas such as nitrogen, helium or argon may also be allowed to pass through the system.

In the modification reaction in the present embodiment, if necessary, an inert solvent can also be used in the condensation reaction. Examples of the solvent include aromatic hydrocarbons such as toluene, ethylbenzene and xylene; saturated aliphatic hydrocarbons such as heptane and hexane; alicyclic hydrocarbons such as cyclohexane; ethers such as dioxane and dibutyl ether; alcohols such as 2-propanol; ketones such as methyl isobutyl ketone; carboxylic acid esters such as ethyl propionate; and carboxylic acids such as acetic acid.

The reaction time of the modification reaction in the present embodiment is preferably 0.5 to 20 hours, more preferably 1 to 15 hours, and further preferably 2 to 10 hours. When the reaction time falls within such a range, a resin excellent in thermal decomposition resistance and solubility in a solvent is obtained economically and industrially.

The reaction temperature of the modification reaction in the present embodiment is preferably 80 to 300° C., more preferably 85 to 270° C., and further preferably 90 to 240° C. When the reaction temperature falls within such a range, a resin excellent in thermal decomposition resistance and solubility in a solvent is obtained economically and industrially.

After the completion of the modification reaction, the solvent is; if necessary, further added for dilution; and then left to still stand to thereby separate two phases; a resin phase as an oil phase and an aqueous phase are separated from each other; thereafter washing with water is performed to thereby completely remove the acidic catalyst; and the solvent added and the unreacted raw materials are removed by a common method such as distillation, thereby providing the modified naphthalene formaldehyde resin.

The modified naphthalene formaldehyde resin of the present embodiment has an increased thermal decomposition resistance and hydroxyl value as compared with the unmodified naphthalene formaldehyde resin or the deacetalized formaldehyde resin. When the modification is performed, for example, under conditions of an amount of the acidic catalyst used of 0.05 parts by mass, a reaction time of 5 hours, and a reaction temperature of 200° C., the resulting resin has an increased thermal decomposition resistance by about 1 to 50% and an increased hydroxyl value by about 1 to 300.

The modified naphthalene formaldehyde resin of the present embodiment preferably, but not particularly limited, has a number average molecular weight (Mn) in terms of polystyrene determined by gel permeation chromatography (GPC) analysis, of 250 to 1200, more preferably 275 to 1100, further preferably 300 to 1000, from the viewpoints of thermal decomposition resistance and solubility in a solvent.

The modified naphthalene formaldehyde resin of the present embodiment preferably, but not particularly limited, has a weight average molecular weight (Mw) in terms of polystyrene determined by GPC analysis, of 300 to 3500, more preferably 350 to 3250, further preferably 400 to 3000, from the viewpoints of thermal decomposition resistance and solubility in a solvent.

The modified naphthalene formaldehyde resin of the present embodiment preferably, but not particularly limited, has a distribution (Mw/Mn) of 1.2 to 3.0, more preferably 1.25 to 2.75, further preferably 1.3 to 2.5, from the viewpoints of thermal decomposition resistance and solubility in a solvent.

The modified naphthalene formaldehyde resin of the present embodiment preferably, but not particularly limited, has a carbon content in the resin by organic elemental analysis, of 75 to 92% by mass, more preferably 77.5 to 91% by mass, further preferably 80 to 90% by mass, from the viewpoints of thermal decomposition resistance and solubility in dissolution.

The modified naphthalene formaldehyde resin of the present embodiment preferably, but not particularly limited, has an oxygen content in the resin by organic elemental analysis, of 2.5 to 15% by mass, more preferably 3 to 13% by mass, further preferably 3.5 to 11% by mass, from the viewpoints of thermal decomposition resistance and solubility in a solvent.

The modified naphthalene formaldehyde resin of the present embodiment preferably, but not particularly limited, has a softening point of 60 to 240° C., more preferably 70 to 230° C., further preferably 80 to 220° C., from the viewpoints of thermal decomposition resistance and handling.

The modified naphthalene formaldehyde resin of the present embodiment preferably, but not particularly limited, has a hydroxyl value of 60 to 260, more preferably 70 to 250, further preferably 80 to 240, from the viewpoints of thermal decomposition resistance and solubility in a solvent.

EXAMPLES

Hereinafter, the present embodiment will be further described with reference to Examples in more detail, but the present invention is not limited by these Examples at all.
<Molecular Weights>
The weight average molecular weight (Mw) and the number average molecular weight (Mn) in terms of polystyrene were determined by gel permeation chromatography (GPC) analysis, and the distribution (Mw/Mn) was determined.
Apparatus: Shodex GPC-101 Model (manufactured by Showa Denko K. K.)
Column: LF-804×3
Eluent: THF 1 ml/min
Temperature: 40° C.
<Carbon Content and Oxygen Content in Resin>
The carbon content and the oxygen content (% by mass) in a resin were determined by organic elemental analysis. In addition, the molar number of oxygen contained in 1 g of a resin was calculated according to the following expression.
Apparatus: CHN Corder MT-6 (manufactured by Yanaco Bunseki Kogyo Co.)
Expression: molar number of oxygen contained in 1 g of resin (mol/g)=oxygen content (% by mass)/16
<Softening Point>
The softening point of a resin was measured according to JIS-K5601.
<Thermal Decomposition Resistance>
The thermal decomposition resistance was evaluated using the measurement value of the thermal weight loss rate (amount thermally decomposed (%)) when the temperature reached 400° C., by thermal analysis.
Apparatus: TG/DTA6200 (manufactured by SII Nanotechnology Inc.)
Measurement temperature: 30 to 550° C. (rate of temperature rise: 10° C./min)
Measurement atmosphere: under air flowing
<Hydroxyl Value>
The hydroxyl value of a resin was measured according to JIS-K1557.

Example 1

Naphthalene Formaldehyde Resin

A bottom-removable four-necked flask having an inner volume of 1 L and equipped with a Dimroth condenser, a thermometer and a stirring blade was charged with 64.1 g of naphthalene (0.5 mol, produced by Kanto Chemical Co., Inc.), 150 g of an aqueous 40% by mass formalin solution (2 mol as formaldehyde, produced by Mitsubishi Gas Chemical Company, Inc.) and 79.7 g of 98% by mass sulfuric acid (produced by Kanto Chemical Co., Inc.) in a nitrogen stream, and the content of the flask was reacted while stirring under reflux under ordinary pressure at 100° C. for 6 hours. Thereto was added 150 g of ethylbenzene (produced by Kanto Chemical Co., Inc.) as a dilution solvent and left to still stand, and then an aqueous phase as a lower phase was removed. Furthermore, the resultant was subjected to neutralization and washing with water, and ethylbenzene and unreacted naphthalene were distilled off under reduced pressure to thereby provide 69.7 g of a naphthalene formaldehyde resin as a light yellow solid.

As the GPC measurement results, the Mn was 459, the Mw was 882, and the Mw/Mn was 1.92. As the results of organic elemental analysis, the carbon content was 86.4% by mass, and the oxygen content was 8.0% by mass (the molar number of oxygen contained in 1 g of the resin was 0.0050 mol/g). The softening point was 84° C. and the hydroxyl value was 25 mgKOH/g.

Example 2

Deacetalized Naphthalene Formaldehyde Resin

A four-necked flask having an inner volume of 0.5 L and equipped with a Dean-Stark tube having a Dimroth condenser set thereto, a thermometer and a stirring blade was charged with 50.0 g of the naphthalene formaldehyde resin obtained in Example 1, 50 g of ethylbenzene (produced by Kanto Chemical Co., Inc.) and 50 g of methyl isobutyl ketone (produced by Kanto Chemical Co., Inc.) for dissolving at 120° C., and 2.5 mg of paratoluenesulfonic acid (produced by Wako Pure Chemical Industries, Ltd.) was added thereto under steam flowing with stirring, to start the reaction. After 2 hours, 1.3 mg of paratoluenesulfonic acid (produced by Wako Pure Chemical Industries, Ltd.) was further added thereto for the reaction for further 3 hours (5 hours in total).

After dilution with 150 g of ethylbenzene (produced by Kanto Chemical Co., Inc.), the resultant was subjected to neutralization and washing with water, and the solvent was removed under reduced pressure to thereby provide 40.9 g of a deacetalized naphthalene formaldehyde resin as a light red solid.

As the GPC measurement results, the Mn was 290, the Mw was 764, and the Mw/Mn was 2.63. As the results of organic elemental analysis, the carbon content was 87.9% by mass, and the oxygen content was 5.9% by mass (the molar number of oxygen contained in 1 g of the resin was 0.0037 mol/g). The softening point was 107° C. and the hydroxyl value was 32 mgKOH/g.

Comparative Example 1

Dimethylnaphthalene Formaldehyde Resin

A bottom-removable four-necked flask having an inner volume of 1 L and equipped with a Dimroth condenser, a thermometer and a stirring blade was charged with 78.1 g of 1,5-dimethylnaphthalene (0.5 mol, produced by Mitsubishi Gas Chemical Company, Inc.), 150 g of an aqueous 40% by mass formalin solution (2 mol as formaldehyde, produced by Mitsubishi Gas Chemical Company, Inc.) and 66.2 g of 98% by mass sulfuric acid (produced by Kanto Chemical Co., Inc.)

in a nitrogen stream, and the content of the flask was reacted while stirring under reflux under ordinary pressure at 100° C. for 6 hours. Thereto was added 150 g of ethylbenzene (produced by Kanto Chemical Co., Inc.) as a dilution solvent and left to still stand, and then an aqueous phase as a lower phase was removed. Furthermore, the resultant was subjected to neutralization and washing with water, and ethylbenzene and unreacted 1,5-dimethylnaphthalene were distilled off under reduced pressure to thereby provide 92.4 g of a dimethylnaphthalene formaldehyde resin as a light yellow solid.

As the GPC measurement results, the Mn was 526, the Mw was 992, and the Mw/Mn was 1.89. As the results of organic elemental analysis, the carbon content was 83.9% by mass, and the oxygen content was 8.6% by mass (the molar number of oxygen contained in 1 g of the resin was 0.0054 mol/g). The softening point was 81° C. and the hydroxyl value was 19 mgKOH/g.

Example 3

Modified Naphthalene Formaldehyde Resin

A four-necked flask having an inner volume of 0.5 L and equipped with a Liebig condenser, a thermometer and a stirring blade was charged with 50.0 g of the naphthalene formaldehyde resin resin obtained in Example 1 (the molar number of oxygen contained was 0.25 mol) and 72.2 g of 1-naphthol (0.50 mol, produced by Tokyo Chemical Industry, Co., Ltd.) under a nitrogen stream for heating and melting at 120° C., and 3.8 mg of paratoluenesulfonic acid (produced by Wako Pure Chemical Industries, Ltd.) was then added with stirring, to start the reaction. After the resultant was immediately heated to raise its temperature to 190° C. and retained with stirring for 3 hours, 2.5 mg of paratoluenesulfonic acid (produced by Wako Pure Chemical Industries, Ltd.) was added, and the resultant was further heated to raise its temperature to 220° C. for the reaction for 2 hours (5 hours in total). After dilution with 300 g of a mixed solvent (metaxylene (produced by Mitsubishi Gas Chemical Company, Inc.)/methyl isobutyl ketone (produced by Kanto Chemical Co., Inc.)=1/1 (weight ratio)), the resultant was subjected to neutralization and washing with water, and the solvent was removed under reduced pressure to thereby provide 80.0 g of a modified naphthalene formaldehyde resin as a blackish brown solid.

As the GPC measurement results, the Mn was 465, the Mw was 669, and the Mw/Mn was 1.44. As the results of organic elemental analysis, the carbon content was 89.5% by mass, and the oxygen content was 5.2% by mass. The thermal weight loss rate (%) when the temperature reached 400° C. was 15%. The hydroxyl value was 198 mgKOH/g. In addition, the resulting resin was soluble when a weight ratio, resin/propylene glycol monomethyl ether acetate (PGMEA), was 1/9.

Example 4

Modified Naphthalene Formaldehyde Resin

A four-necked flask having an inner volume of 0.3 L and equipped with a Liebig condenser, a thermometer and a stirring blade was charged with 40.5 g of the deacetalized naphthalene formaldehyde resin obtained in Example 2 (the molar number of oxygen contained was 0.15 mol) and 43.3 g of 1-naphthol (0.30 mol, produced by Tokyo Chemical Industry, Co., Ltd.) under a nitrogen stream for heating and melting at 120° C., and 2.3 mg of paratoluenesulfonic acid (produced by Wako Pure Chemical Industries, Ltd.) was then added with stirring, to start the reaction. After the resultant was immediately heated to raise its temperature to 190° C. and retained with stirring for 3 hours, 1.5 mg of paratoluenesulfonic acid (produced by Wako Pure Chemical Industries, Ltd.) was added, and the resultant was further heated to raise its temperature to 220° C. for the reaction for 2 hours (5 hours in total). After dilution with 180 g of a mixed solvent (metaxylene (produced by Mitsubishi Gas Chemical Company, Inc.)/methyl isobutyl ketone (produced by Kanto Chemical Co., Inc.)=1/1 (weight ratio)), the resultant was subjected to neutralization and washing with water, and the solvent was removed under reduced pressure to thereby provide 48.1 g of a modified deacetalized naphthalene formaldehyde resin as a blackish brown solid.

As the GPC measurement results, the Mn was 493, the Mw was 750, and the Mw/Mn was 1.52. As the results of organic elemental analysis, the carbon content was 89.9% by mass, and the oxygen content was 4.9% by mass. The thermal weight loss rate (%) when the temperature reached 400° C. was 9%. The hydroxyl value was 192 mgKOH/g. In addition, the resulting resin was soluble when a weight ratio, resin/propylene glycol monomethyl ether acetate (PGMEA), was 1/9.

Comparative Example 2

Modified Dimethylnaphthalene Formaldehyde Resin

A four-necked flask having an inner volume of 0.5 L and equipped with a Liebig condenser, a thermometer and a stirring blade was charged with 46.3 g of the resin obtained in Comparative Example 1 (the molar number of oxygen contained was 0.25 mol) and 72.2 g of 1-naphthol (0.50 mol, produced by Tokyo Chemical Industry, Co., Ltd.) under a nitrogen stream for heating and melting at 120° C., and 3.6 mg of paratoluenesulfonic acid (produced by Wako Pure Chemical Industries, Ltd.) was then added with stirring, to start the reaction. After the resultant was immediately heated to raise its temperature to 190° C. and retained with stirring for 3 hours, 2.4 mg of paratoluenesulfonic acid (produced by Wako Pure Chemical Industries, Ltd.) was added, and the resultant was further heated to raise its temperature to 220° C. for the reaction for 2 hours (5 hours in total). After dilution with 300 g of a mixed solvent (metaxylene (produced by Mitsubishi Gas Chemical Company, Inc.)/methyl isobutyl ketone (produced by Kanto Chemical Co., Inc.)=1/1 (weight ratio)), the resultant was subjected to neutralization and washing with water, and the solvent was removed under reduced pressure to thereby provide 79.4 g of a modified dimethylnaphthalene formaldehyde resin as a blackish brown solid.

As the GPC measurement results, the Mn was 462, the Mw was 693, and the Mw/Mn was 1.50. As the results of organic elemental analysis, the carbon content was 89.3% by mass, and the oxygen content was 4.7% by mass. The thermal weight loss rate (%) when the temperature reached 400° C. was 32%. The hydroxyl value was 195 mgKOH/g. In addition, the resulting resin was soluble when a weight ratio, resin/propylene glycol monomethyl ether acetate (PGMEA), was 1/9.

Example 5

Naphthalene Formaldehyde Resin

A bottom-removable four-necked flask having an inner volume of 2 L and equipped with a Dimroth condenser, a thermometer and a stirring blade was charged with 288 g of naphthalene (2.25 mol, produced by Wako Pure Chemical Industries, Ltd.), 821 g of an aqueous 37% by mass formalin solution (10.1 mol as formaldehyde, produced by Mitsubishi Gas Chemical Company, Inc.) and 407 g of 98% by mass sulfuric acid (produced by Mitsubishi Gas Chemical Company, Inc.) in a nitrogen stream, and the content of the flask was reacted while stirring under reflux under ordinary pressure at about 100° C. for 7 hours. Thereto was added 500 g of ethylbenzene (produced by Wako Pure Chemical Industries, Ltd.) as a dilution solvent and left to still stand, and then an aqueous phase as a lower phase was removed. Furthermore, the resultant was subjected to neutralization and washing with water, ethylbenzene and unreacted naphthalene were distilled off under reduced pressure to thereby provide 379 g of a naphthalene formaldehyde resin as a light yellow solid.

As the GPC measurement results, the Mn was 455, the Mw was 888, and the Mw/Mn was 1.95. As the results of organic elemental analysis, the carbon content was 84.6% by mass, and the oxygen content was 9.2% by mass. The softening point was 72° C.

Example 6

Naphthalene Formaldehyde Resin

A bottom-removable four-necked flask having an inner volume of 2 L and equipped with a Dimroth condenser, a thermometer and a stirring blade was charged with 912 g of an aqueous 37% by mass formalin solution (11.2 mol as formaldehyde, produced by Mitsubishi Gas Chemical Company, Inc.) and 485 g of 98% by mass sulfuric acid (produced by Mitsubishi Gas Chemical Company, Inc.) in a nitrogen stream, 288 g of naphthalene (2.25 mol, produced by Wako Pure Chemical Industries, Ltd.) was dropped thereto over 6 hours while stirring under reflux under ordinary pressure at about 100° C., and the reaction was performed as it was for further 1 hour. Thereto was added 500 g of ethylbenzene (produced by Wako Pure Chemical Industries, Ltd.) as a dilution solvent and left to still stand, and then an aqueous phase as a lower phase was removed. Furthermore, the resultant was subjected to neutralization and washing with water, and ethylbenzene and unreacted naphthalene were distilled off under reduced pressure to thereby provide 371 g of a naphthalene formaldehyde resin as a light yellow solid.

As the GPC measurement results, the Mn was 530, the Mw was 1090, and the Mw/Mn was 2.06. As the results of organic elemental analysis, the carbon content was 83.8% by mass, and the oxygen content was 10.0% by mass. The softening point was 80° C.

Example 7

Naphthalene Formaldehyde Resin

A bottom-removable four-necked flask having an inner volume of 2 L and equipped with a Dimroth condenser, a thermometer and a stirring blade was charged with 384 g of 86% by mass paraformaldehyde (11.0 mol as formaldehyde, produced by Mitsubishi Gas Chemical Company, Inc.), 437 g of ion-exchange water (produced by Mitsubishi Gas Chemical Company, Inc.), 297 g of 1-butanol (produced by Wako Pure Chemical Industries, Ltd.) and 398 g of 98% by mass sulfuric acid (produced by Mitsubishi Gas Chemical Company, Inc.) in a nitrogen stream, 256 g of naphthalene (2.0 mol, produced by Wako Pure Chemical Industries, Ltd.) was dropped thereto over 6 hours while stirring under reflux under ordinary pressure at about 100° C., and the reaction was performed as it was for further 2 hours. Thereto was added 500 g of ethylbenzene (produced by Wako Pure Chemical Industries, Ltd.) as a dilution solvent and left to still stand, and then an aqueous phase as a lower phase was removed. Furthermore, the resultant was subjected to neutralization and washing with water, and ethylbenzene and unreacted naphthalene were distilled off under reduced pressure to thereby provide 319 g of a naphthalene formaldehyde resin as a light yellow liquid.

As the GPC measurement results, the Mn was 318, the Mw was 399, and the Mw/Mn was 1.25. As the results of organic elemental analysis, the carbon content was 78.4% by mass, and the oxygen content was 14.1% by mass.

Example 8

Deacetalized Naphthalene Formaldehyde Resin

A four-necked flask having an inner volume of 0.5 L and equipped with a Liebig condenser, a thermometer and a stirring blade was charged with 250.0 g of the naphthalene formaldehyde resin obtained in Example 5 for dissolving at 120° C., 25 mg of paratoluenesulfonic acid (produced by Wako Pure Chemical Industries, Ltd.) was then added under steam flowing while stirring and heated to raise its temperature to 190° C., and the reaction was then performed as it was for 4 hours to thereby provide 230 g of a deacetalized naphthalene formaldehyde resin as a light red solid.

As the GPC measurement results, the Mn was 664, the Mw was 2396, and the Mw/Mn was 3.61. As the results of organic elemental analysis, the carbon content was 89.4% by mass, and the oxygen content was 4.6% by mass.

Example 9

Deacetalized Naphthalene Formaldehyde Resin

A four-necked flask having an inner volume of 0.5 L and equipped with a Liebig condenser, a thermometer and a stirring blade was charged with 204.0 g of the naphthalene formaldehyde resin obtained in Example 5 for dissolving at 120° C., 40 mg of paratoluenesulfonic acid (produced by Wako Pure Chemical Industries, Ltd.) was then added under steam flowing while stirring and heated to raise its temperature to 190° C., and the reaction was then performed as it was for 4 hours to thereby provide 184 g of a deacetalized naphthalene formaldehyde resin as a light red solid.

As the GPC measurement results, the Mn was 747, the Mw was 3804, and the Mw/Mn was 5.09. As the results of organic elemental analysis, the carbon content was 90.5% by mass, and the oxygen content was 3.6% by mass.

Example 10

Deacetalized Naphthalene Formaldehyde Resin

A four-necked flask having an inner volume of 0.5 L and equipped with a Liebig condenser, a thermometer and a stirring blade was charged with 250.0 g of the naphthalene formaldehyde resin obtained in Example 5 for dissolving at 120° C., 125 mg of paratoluenesulfonic acid (produced by Wako Pure Chemical Industries, Ltd.) was then added under steam flowing while stirring and heated to raise its temperature to 190° C., and the reaction was then performed as it was for 4 hours to thereby provide 220 g of a deacetalized naphthalene formaldehyde resin as a light red solid.

As the GPC measurement results, the Mn was 809, the Mw was 5382, and the Mw/Mn was 6.66. As the results of organic elemental analysis, the carbon content was 90.9% by mass, and the oxygen content was 3.2% by mass.

Example 11

Deacetalized Naphthalene Formaldehyde Resin

A four-necked flask having an inner volume of 0.5 L and equipped with a Liebig condenser, a thermometer and a stirring blade was charged with 132.0 g of the naphthalene formaldehyde resin obtained in Example 6 for dissolving at 120° C., 2.6 mg of paratoluenesulfonic acid (produced by Wako Pure Chemical Industries, Ltd.) was then added under steam flowing while stirring and heated to raise its temperature to 190° C., and the reaction was then performed as it was for 4 hours to thereby provide 111 g of a deacetalized naphthalene formaldehyde resin as a light red solid.

As the GPC measurement results, the Mn was 648, the Mw was 1884, and the Mw/Mn was 2.91. As the results of organic elemental analysis, the carbon content was 87.1% by mass, and the oxygen content was 6.8% by mass.

Example 12

Deacetalized Naphthalene Formaldehyde Resin

A four-necked flask having an inner volume of 0.5 L and equipped with a Liebig condenser, a thermometer and a stirring blade was charged with 135.0 g of the naphthalene formaldehyde resin obtained in Example 7, 2.7 mg of paratoluenesulfonic acid (produced by Wako Pure Chemical Industries, Ltd.) was added under steam flowing while stirring at 120° C. and heated to raise its temperature to 190° C., and the reaction was then performed as it was for 4 hours to thereby provide 83 g of a deacetalized naphthalene formaldehyde resin as a light red solid.

As the GPC measurement results, the Mn was 430, the Mw was 696, and the Mw/Mn was 1.62. As the results of organic elemental analysis, the carbon content was 85.6% by mass, and the oxygen content was 8.0% by mass.

Example 13

Modified Naphthalene Formaldehyde Resin

A four-necked flask having an inner volume of 0.5 L and equipped with a Liebig condenser, a thermometer and a stirring blade was charged with 105 g of phenol (produced by Wako Pure Chemical Industries, Ltd.) under a nitrogen stream and heated to raise its temperature to 100° C., 19.1 mg of paratoluenesulfonic acid (produced by Wako Pure Chemical Industries, Ltd.) was then added thereto, a solution obtained by dissolving 87.0 g of the deacetalized naphthalene formaldehyde resin obtained in Example 11 in 37 g of ethylbenzene (produced by Wako Pure Chemical Industries, Ltd.) was dropped thereto under ordinary pressure over 1 hour while being heated to raise its temperature to 190° C., and the reaction was performed as it was for further 3 hours.

After dilution with 400 g of a mixed solvent (ethylbenzene/methyl isobutyl ketone (produced by Wako Pure Chemical Industries, Ltd.)=1/1 (weight ratio)), the resultant was subjected to neutralization and washing with water, and the solvent and unreacted phenol were removed under reduced pressure to thereby provide 110.0 g of a modified naphthalene formaldehyde resin as a blackish brown solid.

As the GPC measurement results, the Mn was 649, the Mw was 1019, and the Mw/Mn was 1.57. As the results of organic elemental analysis, the carbon content was 87.4% by mass, and the oxygen content was 6.7% by mass. The thermal weight loss rate (%) when the temperature reached 400° C. was 8%. The hydroxyl value was 198 mgKOH/g. In addition, the resulting resin was soluble in a weight ratio, resin/propylene glycol monomethyl ether acetate (PGMEA), of 1/9.

Example 14

Modified Naphthalene Formaldehyde Resin

A four-necked flask having an inner volume of 0.5 L and equipped with a Liebig condenser, a thermometer and a stirring blade was charged with 156 g of phenol (produced by Wako Pure Chemical Industries, Ltd.) under a nitrogen stream and heated to raise its temperature to 100° C., 23.9 mg of paratoluenesulfonic acid (produced by Wako Pure Chemical Industries, Ltd.) was then added thereto, and a solution obtained by dissolving 83.4 g of the deacetalized naphthalene formaldehyde resin obtained in Example 12 in 36 g of ethylbenzene (produced by Wako Pure Chemical Industries, Ltd.) was dropped thereto under ordinary pressure over 1 hour while being heated to raise its temperature to 190° C., and the reaction was performed as it was for further 3 hours.

After dilution with 400 g of a mixed solvent (ethylbenzene/methyl isobutyl ketone (produced by Wako Pure Chemical Industries, Ltd.)=1/1 (weight ratio)), the resultant was subjected to neutralization and washing with water, and the solvent and unreacted phenol were removed under reduced pressure to thereby provide 99.0 g of a modified naphthalene formaldehyde resin as a blackish brown solid.

As the GPC measurement results, the Mn was 480, the Mw was 630, and the Mw/Mn was 1.31. As the results of organic elemental analysis, the carbon content was 86.3% by mass, and the oxygen content was 7.8% by mass. The thermal weight loss rate (%) when the temperature reached 400° C. was 16%. The hydroxyl value was 242 mgKOH/g. In addition, the resulting resin was soluble in a weight ratio, resin/propylene glycol monomethyl ether acetate (PGMEA), of 1/9.

Example 15

Modified Naphthalene Formaldehyde Resin

A four-necked flask having an inner volume of 0.5 L and equipped with a Liebig condenser, a thermometer and a stirring blade was charged with 121 g of 1-naphthol (produced by Sugai Chemical Ind. Co., Ltd.) under a nitrogen stream and heated to raise its temperature to 120° C., 18.8 mg of paratoluenesulfonic acid (produced by Wako Pure Chemical Industries, Ltd.) was then added thereto, a solution obtained by dissolving 67.1 g of the deacetalized naphthalene formaldehyde resin obtained in Example 12 in 28.9 g of ethylbenzene (produced by Wako Pure Chemical Industries, Ltd.) was dropped thereto under ordinary pressure over 1 hour while being heated to raise its temperature to 190° C., and the reaction was performed as it was for further 3 hours.

After dilution with 400 g of a mixed solvent (ethylbenzene/methyl isobutyl ketone (produced by Wako Pure Chemical Industries, Ltd.)=1/1 (weight ratio)), the resultant was subjected to neutralization and washing with water, and the solvent and unreacted naphthol were removed under reduced pressure to thereby provide 108.0 g of a modified naphthalene formaldehyde resin as a blackish brown solid.

As the GPC measurement results, the Mn was 481, the Mw was 619, and the Mw/Mn was 1.29. As the results of organic elemental analysis, the carbon content was 88.5% by mass, and the oxygen content was 6.0% by mass. The thermal weight loss rate (%) when the temperature reached 400° C. was 11%. The hydroxyl value was 186 mgKOH/g. In addition, the resulting resin was soluble in a weight ratio, resin/propylene glycol monomethyl ether acetate (PGMEA), of 1/9.

TABLE 1

|  | Example 3 | Example 4 | Comparative Example 2 | Example 13 | Example 14 | Example 15 |
|---|---|---|---|---|---|---|
| Thermal weight loss rate, at 400° C., under air flowing | 15% | 9% | 32% | 8% | 16% | 11% |
| Solubility (PGMEA 10 wt %) | ○ | ○ | ○ | ○ | ○ | ○ |

It is found from Table 1 that the modified naphthalene formaldehyde resin is excellent in thermal decomposition resistance and also excellent in solubility in propylene glycol monomethyl ether acetate (PGMEA) as compared with the modified dimethylnaphthalene formaldehyde resin.

It is to be noted that the present application claims the priority based on Japanese Patent Application (Japanese Patent Application No. 2012-018080) filed with JPO on Jan. 31, 2012 and the content thereof is herein incorporated by reference.

INDUSTRIAL APPLICABILITY

The naphthalene formaldehyde resin, the deacetalized naphthalene formaldehyde resin and the modified naphthalene formaldehyde resin of the present invention can be utilized in wide applications such as electrically insulating materials, resist resins, semiconductor sealing resins, adhesives for printed wiring boards; matrix resins for electrical laminated plates mounted on electric equipment, electronic equipment, industrial equipment and the like; materials for build-up laminated plates, resins for fiber-reinforced plastics, sealing resins for liquid crystal display panels, paints, various coating agents, adhesives, coating agents for semiconductors, or resist resins for semiconductor manufacturing.

The invention claimed is:

1. A modified naphthalene formaldehyde resin obtained by reacting a deacetalized naphthalene formaldehyde resin and a compound represented by formula (2) in the presence of an acidic catalyst:

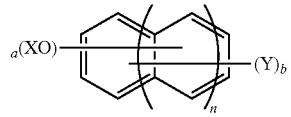
(2)

wherein X and Y each independently represent a hydrogen atom, an alkyl group having 1 to 10 carbon atoms, an aryl group having 6 to 10 carbon atoms or a cyclohexyl group, a and b each represent an integer of 1 to 3, and n represents an integer of 0 to 2, the deacetalized naphthalene formaldehyde resin is obtained by subjecting a naphthalene formaldehyde resin to a deacetal treatment in the presence of water and an acidic catalyst, and the naphthalene formaldehyde resin is obtained by reacting a compound (A) represented by formula (1) and formaldehyde (B) in a molar ratio, (A):B), of 1:1 to 1:20 in the presence of an acidic catalyst,

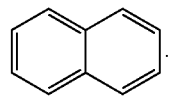
(1)

2. The modified naphthalene formaldehyde resin according to claim 1, wherein the compound represented by the formula (2) is at least one selected from the group consisting of phenol, phenylphenol, naphthol, dihydroxynaphthalene, hydroxyanthracene and dihydroxyanthracene.

* * * * *